United States Patent
Horowitz et al.

(10) Patent No.: US 6,323,276 B2
(45) Date of Patent: Nov. 27, 2001

(54) METHODS AND APPARATUS FOR THE PRODUCTION OF AMORPHOUS POLYMER SUSPENSIONS

(75) Inventors: Daniel Horowitz, Somerville, MA (US); Tillman U. Gerngross, Hanover, NH (US)

(73) Assignee: Metabolix, Inc., Cambridge, MA (US)

(*) Notice: Subject to any disclaimer, the term of this patent is extended or adjusted under 35 U.S.C. 154(b) by 0 days.

(21) Appl. No.: 09/843,556

(22) Filed: Apr. 26, 2001

Related U.S. Application Data

(62) Division of application No. 09/328,783, filed on Jun. 9, 1999, now Pat. No. 6,228,934.
(60) Provisional application No. 60/088,565, filed on Jun. 9, 1998.

(51) Int. Cl.$^7$ .................. C08F 2/16; C08F 6/00
(52) U.S. Cl. ............. 524/800; 524/801; 524/802; 525/437; 525/450; 526/62; 528/499; 528/503
(58) Field of Search .................. 524/800, 801, 524/802; 525/437, 450; 526/62; 528/499, 503

(56) References Cited

U.S. PATENT DOCUMENTS

| | | |
|---|---|---|
| 4,602,082 | 7/1986 | Akiyama et al. . |
| 5,451,456 | 9/1995 | Marchessault et al. . |
| 5,599,891 | 2/1997 | Horowitz et al. . |
| 5,891,936 | 4/1999 | Liddell et al. . |
| 5,952,460 | 9/1999 | Liddell et al. . |

FOREIGN PATENT DOCUMENTS

| | | |
|---|---|---|
| 0 145 233 A2 | 6/1985 | (EP) . |
| 1 503 827 A | 3/1978 | (GB) . |
| 2 009 187 A | 6/1979 | (GB) . |

(List continued on next page.)

OTHER PUBLICATIONS

Barnard & Sanders, "The poly—hydroxybutyrate granule in vivo. A new insight based on NMR spectroscopy of whole cells," *J Biol Chem.* 264(6):3286–91 (1989).
Bloembergen, et al., "Studies of composition and crystallinity of bacterial Poly—hydroxybutyrate–co—hydroxyvalerate)." *Macromolecules*, 19:2865–2871 (1986).
De Koning & Lemstra, "The amorphous state of bacterial poly [(R)–3–hydroxyalkanoate] in vivo, " *Polymer* 33:3292–94 (1992).
Hall, et al., "Cloning of the *Nocardia corallina* polyhydroxyalkanoate synthase gene and production of the poly–(3–hydroxybutyrate–co–3–hydroxyhexanoate) and poly–(3–hydroxyvalerate–co–3–hydroxyheptanoate)," *Can. J. Microbiol.* 44:687–91 (1998).

(List continued on next page.)

*Primary Examiner*—Samuel A. Acquah
(74) *Attorney, Agent, or Firm*—Holland & Knight LLP

(57) ABSTRACT

Methods and apparati have been developed for producing a suspension of predominately amorphous polymer particles, wherein the method includes thermally treating a suspension that includes crystalline or semi-crystalline polymer particles. The thermal treatment includes (a) heating a suspension of polymer particles of an appropriate size to a temperature effective to cause the polymer to become amorphous, and then (b) cooling the suspension of amorphous polymer particles below the melting point of the polymer at a rate effective to prevent substantial coalescence of the polymer particles. The method and apparati are effective for use with a variety of polymers having suitable crystallization parameters, although polyhydroxyalkanoate (PHA) polymers are preferred, particularly in an aqueous suspension medium. For PHA polymers, the polymer particles subjected to treatment preferably are of a size of less than 5 μm, or more preferably less than 1.5 μm in diameter.

6 Claims, 1 Drawing Sheet

FOREIGN PATENT DOCUMENTS

| | | |
|---|---|---|
| 2291648 A | 1/1996 | (GB) . |
| WO 96/00263 A1 | 1/1996 | (WO) . |
| WO 96/06178 A1 | 2/1996 | (WO) . |
| WO 96/06179 A1 | 2/1996 | (WO) . |
| WO 96/17369 A1 | 6/1996 | (WO) . |
| WO 96/24682 A1 | 8/1996 | (WO) . |
| WO 96/25452 A1 | 8/1996 | (WO) . |
| WO 97/07229 A1 | 2/1997 | (WO) . |
| WO 97/07239 A1 | 2/1997 | (WO) . |
| WO 97/15681 A1 | 5/1997 | (WO) . |
| WO 97/20972 A1 | 6/1997 | (WO) . |

OTHER PUBLICATIONS

Horowitz & Sanders, "Amorphous biomimetic granules of polyhydroxybutyrate: Preparation, chracterization, and biological implications," *J. Am. Chem. Soc.* 116:2695–702 (1994).

Horowitz & Sanders, "Phase separation within artificial granules from a blend of polyhydroxyoctanoate: biological implications," *Polymer* (1994).

Horowitz, "Biomimetic, amorphous granules of Poly(hydroxyalkanoates)," Ph.D. Thesis, University of Cambridge, UK, 1994.

Organ & Barham, "Nucleation, growth and morphology of poly(hydroxybutyrate) and its copolymers," *J. Mater. Sci.* 26:1368–74 (1991).

METHODS AND APPARATUS FOR THE PRODUCTION OF AMORPHOUS POLYMER SUSPENSIONS

CROSS-REFERENCE TO RELATED APPLICATIONS

This Appln is a Div. of Ser. No. 09/328,783 filed Jun. 9, 1999, U.S. Pat. No. 6,228,934. which claims to U.S. provisional application Serial No. 60/088,565, filed Jun. 9, 1998.

BACKGROUND OF THE INVENTION

The present invention is generally in the field of suspensions of polymer particles, and more particularly to methods for producing suspensions of amorphous polymer particles, especially of polyhydroxyalkanoate polymers.

Polyhydroxyalkanoates (PHAs) are useful biodegradable thermoplastics obtained from microbes or plants or synthesized chemically. Although typically biological in origin, PHAs may be processed like conventional plastics to produce coatings, films, and molded objects. A particularly useful form of PHAs is a suspension including polymer particles suspended in water, wherein a majority of the particles are in an amorphous, i.e. noncrystalline, state. These suspensions have application in ambient temperature film formation, since the glass transition temperature ($T_g$) of PHAs is generally less than 5° C. Amorphous PHA suspensions (which also are referred to as amorphous latexes or emulsions) have been found to be particularly useful in, for example, architectural paints (GB 2,291,648), cathode-ray tube metallization lacquers (PCT/GB95/02761), and coatings for paper (U.S. Pat. No. 5,451,456), cellulose or nonwoven objects (PCT/GB96/00284), and foods (PCT/NL95/00222).

Amorphous PHA particles can remain noncrystalline almost indefinitely, even when cooled 100° C. or more below the crystalline melting temperature, provided that the particles are sufficiently small and behave independently from each other, as they do in aqueous suspension (Horowitz, et al., *J. Am. Chem. Soc.* 116:2695–702 (1994)). They remain amorphous even if the temperature is maintained well above $T_g$, conditions at which the bulk polymer would crystallize rapidly. This unexpected stability in the amorphous state has been explained based on nucleation kinetics (de Koning & Lemstra, *Polymer* 33:3292–94 (1992)). The theoretical model predicts that the observed rate of crystallization for an ensemble of polymer particles varies inversely with the particle volume, i.e. with the third power of particle diameter. The half-time for the crystallization process accordingly can be expressed as $(\log_e 2)/Iv$, where I is the nucleation rate constant and v is the volume of an individual particle. Using known nucleation rate constant data (Organ & Barham, *J. Mater. Sci,* 26:1368–74 (1991)), the half-times for crystallization of suspensions of various amorphous PHA particle sizes for poly-3-hydroxybutyrate (PHB) and poly-3-hydroxybutyrate-co-7%-hydroxyvalerate (PHBV) (BIOPOL™) at 30° C. have been calculated and are shown in Table 1 below.

TABLE 1

Predicted Half-times for Crystallization of Suspensions of Amorphous PHA Particles

| Particle Size | PHB | PHBV |
|---|---|---|
| 100 µm | 9 min | 44 min |
| 20 µm | 18 hours | 92 hours |
| 5.0 µm | 49 days | 245 days |
| 1.0 µm | 17 years | 84 years |
| 0.2 µm | 2099 years | 10494 years |

Although amorphous particles are quite stable in a water suspension, when the suspension is applied to a surface and allowed to dry, the particles coalesce to form a coherent or semi-coherent crystalline film having desirable functional properties Despite the usefulness of such PHA suspensions for forming biodegradable, hydrolyzable, or thermolyzable films, it has generally proven difficult to prepare these materials on a commercial scale.

In the laboratory, amorphous PHA suspensions have been prepared from crystalline polymer by solvent emulsification routes. For example, the PHAs poly-3-hydroxybutyrate (PHB), poly-3-hydroxybutyrate-co-3-hydroxyvalerate (PHBV or BIOPOL™), and poly-3-hydroxyoctanoate (PHO) have been prepared as amorphous particles by dissolving the polymer in chloroform, emulsifing the polymer solution with a solution of aqueous surfactant, and heating the emulsion to remove the organic solvent (U.S. Pat. No. 5,599,891; Horowitz & Sanders, *Polymer* 35:5079–84 (1994)). Suspensions of amorphous PHO particles also have been prepared by dispersing an acetone solution of the polymer in water, and then removing the acetone by distillation (Marchessault, et al., *Can. J. Microbiol* 41:138–42 (1995)). A similar approach is described in PCT/GB96/00305 by Liddell, et al., in which a suspension of amorphous PHBV is made by mixing a solution of polymer in propanediol at high temperature with water and surfactant, and then removing the organic solvent by diafiltration The disadvantage, however, of all of the foregoing methods is that the particle suspension is highly diluted, necessitating extensive concentration at the end of the process and resulting in a low throughput of material. In addition, an organic solvent is used and removed in the process, which necessitates the use of costly solvent recovery and purification equipment when conducted on a commercial scale.

PCT/GB95/01925 by Liddell, et al. also discloses a method for producing a "PHBV latex" by heating a slurry of crystalline PHBV powder in water and detergent under pressure for ten minutes at a temperature above the melting temperature of the polymer. It is not disclosed whether the particles remained in the amorphous state upon cooling, or what the final particle size of the slurry is. This method, however, has the disadvantage that the particle size of the final product is dictated by the size of the powder starting material, which is at least 20–50 µm. Particles of this size crystallize rapidly upon cooling (see Table 1 above), giving even an initially amorphous suspension a useful shelf-life of less than four days. The duration of the thermal treatment in this case also causes significant further agglomeration of the particles. Suspensions containing large particles are generally unsuitable for film forming applications.

It Is generally preferable to purify PHAs using aqueous (i.e. organic solvent-free) methods, particularly in commercial scale processes, in which the polymer remains in a microparticulate state and the non-PHA biomass is solubilized through mechanical chemical, and/or enzymatic treatments. The PHA particles then are separated from the solubilized material using centrifugation, filtration, floatation, or other convenient methods. For example, EP 0 145 233 discloses aqueous methods for purifying a microbiological 3-hydroxybutyrate polymer wherein the cells are heat-treated at above 80° C. and then digested with enzymes, surfactants, and/or hydrogen peroxide.

Although the PHA granules contained in microbial cells are completely amorphous (Barnard & Sanders, *J. Biol Chem.* 264:3286–91 (1989)), the polymer suspensions obtained through aqueous harvesting methods usually have a substantial percentage of crystalline particles, which accumulate throughout the course of processing (D. M. Horowitz, Ph.D. Thesis, University of Cambridge, UK, 1994). The undesirable crystallization of the polymer particles is most pronounced with those PHAs having relatively fast crystallization kinetics, such as PHB and PHBV copolymers having 20 mol % or less 3-hydroxyvalerate content. The exact mechanism of crystallization is not fully understood; however, it is believed that certain conditions of temperature, shear, and/or contact among polymer particles or between particles and nucleating surfaces all promote crystallization at a rate well beyond that predicted by simple homogeneous nucleation kinetics. It has been found experimentally that the presence of even a modest fraction of crystalline polymer particles in the suspension results in an inferior, porous, and irregular film under ambient temperature conditions, since particle coalescence does not occur.

The undesirable crystallization that occurs during aqueous harvesting may be minimized by the use of various stabilizers, such as alkyl ethoxylates, acrylic graft copolymers, and some ionic surfactants, as disclosed, for example, in PCT/GB96/00284 and PCT/US96/1986However, this approach can be costly and has several disadvantages. The success of the stabilizers in preventing crystallization tends to be polymer composition-dependent, with the faster crystallizing PHAs giving the poorest results. Suspensions of PHB and PHBV copolymers, for example, invariably contain some crystalline particles when processed using the stabilizers. Moreover, the most effective agents are steric stabilizers (for example, the acrylic graft copolymer Hypermer CG6, available from ICI Surfactants) which remain tightly associated with the polymer particles and have a detrimental effect on subsequent film formation.

It is therefore an object of the present invention to provide methods and apparati for producing a suspension of predominately amorphous polymer particles.

It is another object of the present invention to provide aqueous suspensions of amorphous PHA particles having a size suitable for forming PHA coatings, films, and molded objects.

SUMMARY OF THE INVENTION

Methods and apparati are provided for producing a suspension of predominately amorphous polymer particles, wherein the method includes thermally treating a suspension that includes crystalline or semi-crystalline polymer particles. The thermal treatment includes (a) heating a suspension of polymer particles of an appropriate size to a temperature effective to cause the polymer to become amorphous, and then (b) cooling the suspension of amorphous polymer particles below the melting point of the polymer at a rate effective to prevent substantial coalescence of the polymer particles. The method can be conducted in a continuous, semi-continuous or batch mode thermal treatment, and can be performed at non-atmospheric pressure conditions depending upon the polymer and suspending medium selected.

The method and apparati are effective for use with a variety of polymers having suitable crystallization parameters, although polyhydroxyalkanoate (PHA) polymers are preferred, particularly in an aqueous suspension medium. For PHA polymers, the polymer particles subjected to treatment preferably are of a size of less than 5 $\mu$m, or more preferably less than 1.5 $\mu$m, in diameter.

Stable amorphous polymer suspensions made using these methods and apparati also are provided. The polymer of these suspensions preferably is between about 80 and 100% amorphous, and preferably is present in the suspension medium at a concentration of between about 0.1 to 50% wt/wt, and more preferably between about 5 and 40% wt/wt. The amorphous polymer suspension preferably is suitable for use in film formation at ambient temperatures.

DETAILED DESCRIPTION OF THE INVENTION

Figure 1:
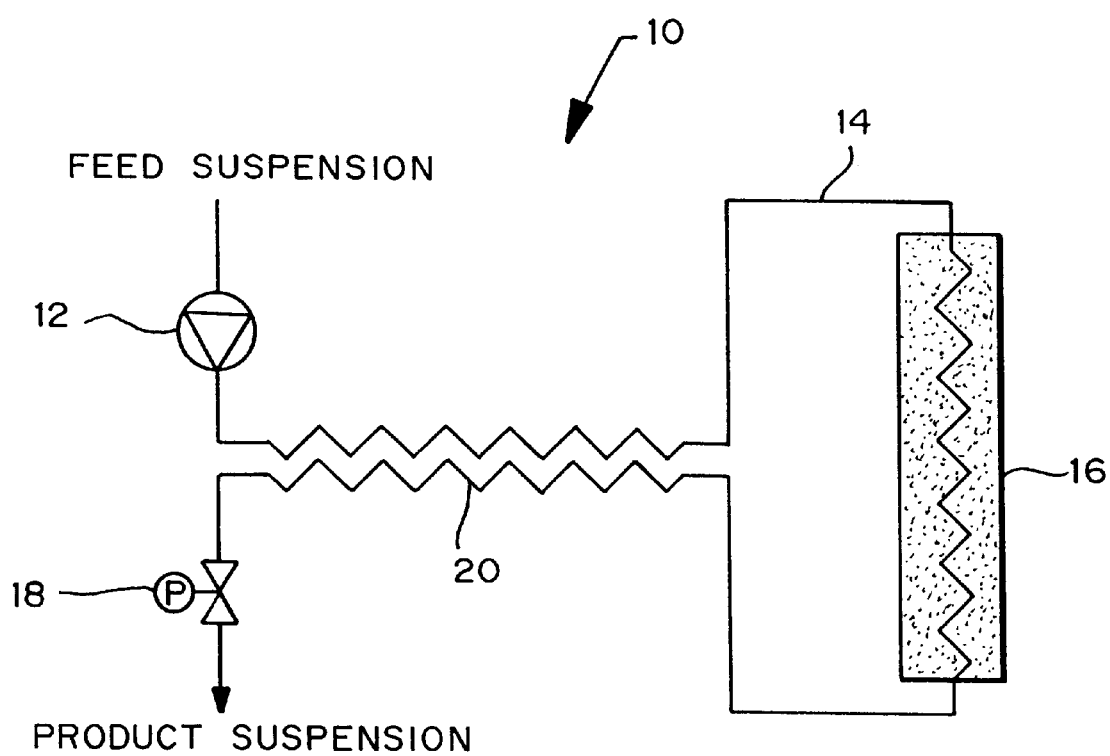
FIG. 1 is a process flow diagram of a preferred embodiment of the apparatus for thermal treatment of the suspension of crystalline polymer particles.

It was discovered that a suspension of highly amorphous polymer articles can be produced by thermally treating a suspension that includes rystalline or semi-crystalline polymer particles, without a significant increase in particle size, provided that the duration of thermal treatment is properly minimized.

I. Suspension of Polymer Particles

The polymer particles preferably are present in the suspension at a concentration between about 0.1 and 50% wt/t and more preferably between about 5 and 40% wt/wt. both before and after thermal treatment.

Polymers

The methods and apparati described herein are useful with a range of polymeric materials having suitable crystallization parameters, although polyhydroxyalkanoates (PHAs) are especially preferred. Representative examples of other polymers which can be used in the methods, compositions, and apparati described herein include polymers such as polyolefins, polyimides, polyamides, and polyesters. The stability of the amorphous particles will depend upon many factors, including the particle size, nucleation kinetics, purity, and presence of surfactants and colloidal stabilizers.

The PHAs can be derived from biological systems including bacteria and genetically engineered plant crops. In bacterial systems, the PHAs are accumulated intracellularly as granular inclusion bodies. PHA also can be produced in genetically engineered plant crops. Methods for recovering PHAs from plant biomass are described, for example in PCT WO 97/15681, PCT WO 97/07239, and PCT WO 97/07229. The methods described herein similarly are useful with a variety of PHAs, regardless of source organism or comonomer composition. Representative PHAs include poly-3-hydroxybutyrate (PHB), poly-3-hydroxybutyrate-co-3-hydroxyvalerate (PHBV, marketed as BIOPOL™ by Monsanto), poly-3-hydroxybutyrate-co-4-hydroxybutyratepoly-3-hydroxypropionate, poly-3-hydroxybutyrate-co-3-hydroxypropionate, poly-4-hydroxybutyrate, poly-3-hydroxybutyrate-co-3-hydroxyhexanoate, poly-3-hydroxybutyrate-co-3-hydroxyoctanoate, poly-5-hydroxyvalerate, and poly-6-hydroxyhexanoate.

The polymer in the product suspension preferably is between about 80 and 100% amorphous. The amorphous polymer suspension preferably is suitable for use in film formation at ambient temperatures, and preferably is stable. As used herein, the term "stable" means that the polymer particles remain amorphous for a commercially useful period of time. For example, the suspension should remain stable at ambient conditions for at least several days, and preferably several weeks or more, following manufacture, shipping, and storage, so that the suspension can be used when desired, particularly when used in film-forming processes.

Particle Size

The particle size of the crystalline or partly crystalline polymer slurry feed is an important consideration in the methods described herein. Generally, PHA powders from aqueous isolation processes are crystalline with a particle size of at least 20–50 μm, which if subjected to the thermal treatment processes described herein would yield amorphous particles that crystallize too rapidly for practical use. Prior to drying, but at the end of an aqueous isolation process, a particle size of 5 μm, with a high degree of crystallinity, is typical (D. M. Horowitz, Ph.D. Thesis, University of Cambridge, UK, 1994). Therefore, the particle size frequently must be reduced before thermal treatment is undertaken.

Treatment of the crystalline slurry through a homogenizer, colloid mill, bead mill, or Microfluidizer is a suitable means to reduce the particle size to the desired range. For example, a treatment of one to four passes through a Microfluidizer gives a suspension of crystalline microparticles about 1 μm median in size, which is suitable for use in the methods described herein. As an alternative or adjunct to particle size reduction, a surfactant, dispersant, or emulsifying agent may be added during the course of the aqueous isolation of the polymer particles, which has the effect of maintaining a smaller particle size throughout the process.

When the polymer is a PHA, it is preferred that the polymer particles subjected to treatment are of a size of less than 5 μm, or more preferably less than 1.5 μm in diameter. Smaller particles have much longer observed lifetimes in the amorphous state (see Table 1) and can be undercooled 100° C. or more below $T_m$ without causing observable crystallization. However, for some slow nucleating materials larger particle sizes may be satisfactory and yield stable amorphous particles.

Suspension Media

The suspension medium is preferably water, although it can be an aqueous solution with at least about 50% (by weight) water with the balance including one or more water-miscible organic solvents, such as alcohols, ketones, acetone, and DMSO. The suspension can include one or more additives, such as surfactants, dispersants, emulsifiers, soaps, or detergents, any of which can be added before, during, or after thermal treatment. Although satisfactory results can also be obtained without such additives, surfactants may be useful to reduce any tendency of the particles to coalesce, aggregate, or adhere to the vessel during the thermal treatment. Representative examples of suitable surfactants include potassium oleate, and BRIJ™ 721 (ICI, United Kingdom). Preferred amounts of surfactant are between about 0.1 and 10% (by weight of surfactant weight of polymer), for example, about 3.4%.

Any surfactant should be chosen such that its surface activity and solubility are maintained at the peak treatment temperature. For example, the use of polyether-containing agents, including many nonionic surfactants and block- or graft-copolymeric stabilizers, may need to be avoided in cases where the cloud point of the agent is below the melting temperature of the crystalline polymer. Surfactants also should be chosen to be compatible with the intended end use. For example, for most film-forming applications, it is desirable to avoid introducing any mineral residues, which would increase the water sensitivity of the film.

II. Thermal Treatment Process

The thermal treatment method includes (a) providing a suspension comprising crystalline or semi-crystalline polymer particles in a suspending medium; (b) heating the suspension to a temperature effective to cause the polymer to become amorphous; and (c) cooling the suspension below the melting point of the polymer at a rate effective to prevent substantial coalescence of the polymer particles.

Successful thermal treatments typically must be conducted at a temperature near, at, or above the melting temperature ($T_m$) of the crystalline polymer particles. As used herein, the term "near" in reference to the $T_m$ means the $T_m \pm 10°$ C., and preferably within about 2 to 5° C. of the $T_m$. The thermal treatment temperature generally has no upper limit, although higher temperatures may trigger polymer degradation, and/or require the use of higher pressure process equipment in order to conduct the thermal treatment without boiling the suspension media. Accordingly, the preferred treatment temperature is generally between about 0 and 25° C. above the $T_m$ of the crystalline polymer.

In many cases, the $T_m$ of the polymer will be in excess of the normal boiling point of the suspending medium. For example, the melting temperature for PHB is around 180° C., and commercial PHBV copolymers typically melt between about 140 and 175° C., temperatures which well exceed the normal boiling point of water. Thus, the thermal treatment process should be performed so as to prevent boiling and evaporation of the water, or other suspension medium, from the suspension. In a preferred embodiment, this effect can conveniently be achieved by performing the process in a closed or pressure-regulated system.

The duration of the thermal treatment should be no longer than necessary to convert the particles from the crystalline to the amorphous state; a few seconds near or above the melting temperature were found to be sufficient. Longer heating times are associated with increased coalescence of the particles, and ultimately phase separation of the polymer as a separate molten layer. It is also therefore desirable that the heating and cooling ramps to which the polymer suspension is subjected be as steep as practical.

The thermal treatment can be conducted in a continuous, batch, or semi-batch process. In a preferred embodiment, a suspension of crystalline or semi-crystalline polymer particles is subjected to a continuous-flow thermal process which yields a suspension of amorphous particles. In one embodiment, the treatment is performed in a batch mode using a closed pressure system. For example, a polymer suspension of appropriate particle size can be heated in a sealable, pressure-rated tube, autoclave or other similar vessel, fitted with a stirring apparatus. The apparatus is then heated, for example, using an oil bath, steam, or other appropriate means. After the required minimum time of treatment, the apparatus is cooled and the product suspension is discharged.

Stirring or agitating the suspension during thermal treatment is generally desirable to prevent settling and to ensure uniform and rapid heating However, significant shearing of the amorphous particles should be avoided, as it may promote coalescence, aggregation, and/or recrystallization of the material.

In some cases, it may be desirable to remove a fraction of coalesced, larger particles, before or after thermal treatment. Such fractions can be removed, for example, by decantion, filtration, or centrifugation using standard process equipment.

III. Thermal Treatment Apparatus

As described above, a preferred embodiment of the method is conducted in continuous-flow thermal process. For example, the polymer suspension is pumped continuously or semi-continuously through a liquid conduit, wherein the suspension is subjected to a suitably high temperature for a brief interval. The conduit typically is operated under pressure to prevent boiling of the suspension medium.

The Apparatus

In a preferred embodiment, the apparatus for producing an amorphous polymer suspension includes (a) a pump suitable for pumping a suspension comprising crystalline or semi-rystaline polymer particles in a suspending medium; (b) a first heat exchanger having an inlet in fluid connection with the discharge of the pump and having an outlet, wherein the first heat exchanger is suitable for heating the suspension to a temperature effective to cause the polymer to become amorphous as the suspension flows between the inlet and the to the outlet; and (c) a second heat exchanger having an inlet in fluid connection with the outlet of the first heat exchanger, wherein the second heat exchanger is suitable for cooling the suspension below the melting point of the polymer at a rate effective to prevent substantial coalescence of the polymer particles.

A preferred embodiment of a continuous-flow, pressurized thermal treatment apparatus is shown in FIG. 1. The thermal treatment apparatus 10 includes pump 12; liquid conduit 14, which includes at least one heated zone 16 (i.e. a zone that is capable of being heated), i.e. the apparatus's first heat exchanger; and a pressure regulating or pressure-relief valve 18. The preferred apparatus also includes suspension heat exchanger 20, which efficiently transfers heat from the amorphous polymer particle (product) suspension to the crystalline polymer particle (feed) suspension. The apparatus optionally can include one or more auxiliary cooling devices (not shown) downstream from the heating zone, as it may be preferable to cool the discharge from the heated zone using an external cooling medium in some processes. The suspension heat exchanger 20 and/or the auxiliary cooling device function as the apparatus's second heat exchanger. Although thermal treatment apparatus 10 has a single suspension heat exchanger 20, it will be readily apparent to those of skill in the art that the apparatus can be modified to use multiple heat exchangers for this purpose. Alternatively, suspension heat exchanger 20 can be eliminated, depending upon the process design conditions and process equipment selected, so long as the heating and cooling functions of the apparatus are served. Standard heat exchanger equipment can be used for heated zone 16, suspension heat exchanger 20, and any auxiliary cooling devices.

Operation of the Apparatus

In a preferred embodiment, thermal treatment apparatus 10 is operated as follows. A suspension of crystalline or partly crystalline polymer particles is fed by means of a pump 12 into a high-pressure loop which includes liquid conduit 14, wherein the thermal treatment occurs. The feed may be at any temperature, provided the suspending medium remains liquid. Within the pressurized section of the loop, pressure is maintained by means of pressure regulating valve 18, which terminates the loop and discharges the amorphous product at a temperature and pressure at which the suspension medium will not boil. The pressure regulating valve is set to maintain an internal pressure which is greater than or equal to the vapor pressure of the suspension medium at the maximum temperature of treatment, in order to prevent boiling of the polymer suspension. The pump 12 obviously must be capable of generating positive flow at the set pressure of pressure-relief valve 18.

The apparatus optionally may be equipped with pressure and temperature monitoring devices at various points in the apparatus, and/or gas bladders to give more uniform flow and pressure behavior. In cases where the maximum treatment temperature does not exceed the boiling point of the suspending medium, the pressure regulating valve may be omitted.

From pump 12, the feed flows through one side or channel of suspension heat exchanger 20 and then into heated zone 16, where a temperature is near, at, or above the melting temperature of the crystalline polymer is induced in the suspension. The heat may be supplied, for example, as steam, gas or electric heating, either directly or via a transfer medium. For example, the polymer suspension may be pumped through a heat exchanger, metal tube, flgw-through vessel, or other device having favorable thermal conductivity. In all cases, the goal is to ensure rapid and efficient transfer of heat into the polymer suspension, bringing the polymer particles to a temperature near, at, or above the crystalline melting temperature. The heated suspension of amorphous polymer particles then flows from heated zone 16 and through the second channel of suspension heat exchanger 20, thereby pre-heating the feed suspension before entering heated zone 16 so as to minimize the heating capacity required of the heated zone 16 and/or to decrease the residence time in heated zone 16. The suspension heat exchanger 20 also cools the product suspension discharged from heated zone 16, preferably to a temperature low enough to prevent boiling of the suspension upon discharge from pressure-relief valve 18.

The compositions, methods and apparati described herein are further described by the following non-limiting examples.

EXAMPLE 1

Preparation of Suspension of Amorphous Particles of PHBV Copolymer with a Monomer Ratio 92:8 HB/HV Particle size was measured by laser light scattering using a Coulter LS130 particle analyzer. Crystallinity index was measured using FTIR by the method described in Bloembergen, et al., *Macromolecules*, 19:2865–70 (1986), except that the determination was made on an aqueous suspension using an attenuated total reflection (ATR) sample device (Nicolet Instrument Corp.). Amorphous particles showed characteristic IR bands at 1185 and 1303 cm$^{-1}$, while crystalline particles showed characteristic bands at 1228, 1280, and 1288 cm$^{-1}$. Percent crystallinity index was estimated using standards, which were prepared by combining known amounts of fully amorphous and fully crystallized particles in water suspension. The fully amorphous particles were prepared as described in Horowitz et al. *J. Am. Chem. Soc.* 116:2695–702 (1994), while the fully crystallized particles were derived from spray-dried PHA powder. A crystallinity index of 100% thus represents the maximum crystallinity which the polymer is normally capable of achieving. For PHB, this corresponds to an X-ray crystallinity of approximately 70%.

Cells of *Ralsionia eutrophus* NCIMB 40124 were fermented to high density on a mixture of glucose and valeric acid under conditions of phosphorus limitation. The cells contained 68% PHA (cell dry weight basis) which was a PHBV copolymer with a monomer ratio 92:8 HB/HV. The PHA was recovered by an aqueous process as follows. The cells were washed by diafiltration with distilled water, microfluidized twice at 15,000 psi and then digested with industrial protease (Alcalase, 1 mL/L, Novo Nordisk) in the presence of 0.5% (wt/vol) sodium dodecylsulfate (SDS) and 0.25% (wt/vol) Hypermer CG6 (ICI Surfactants) for 1 hr at 50° C. (pH 9). The resulting PHA suspension was washed by diafiltration (U.S. Filter Membralox ceramic element with a 0.1 µm nominal cutoff) with 2 vol. of water containing 0.5% (wt/vol) SDS and 0.25% (wt/vol) Hypermer CG-6. After diafiltration the suspension was treated with hydrogen peroxide, 3% wt/vol, for 3 hr in the presence of diethylenetriaminepentaacetic acid (DTPA, 100 mg/L), at 80° C. The pH was maintained at 7 using ammonium hydroxide. The product was diafiltered as above with 6 vol. water containing 0.5% (wt/vol) SDS and 0.25% (wt/vol) Hypermer CG-6 followed by 6 vol. pure water. The particles were collected by centrifugation and resuspended in water at a concentration of 13% wt/wt. This PHA suspension, which had a median particle size of 3.9 µm and a crystallinity index of 100%, was used as the starting material in the process of producing a suspension of amorphous polymeric particles.

The PHA suspension then was processed four times through a Microfluidizer M110EH (Microfluidics International, Newton, Mass.) at an operating pressure of 15,000 psi. The resulting suspension had a crystallinity index of 100% and a median particle size of 0.50 µm. The melting temperature of the crystalline polymer was determined to be 169° C.

A portion of suspension (5 mL) was charged into a pressure-rate glass tube (Ace Glass), fitted with a magnetic stir bar, and then immersed for 5 min. in a silicone oil bath at 190° C. The tube then was removed and cooled down to room temperature. The product was a suspension of amorphous particles (0% crystallinity index by FTIR) with a median particle size of 0.53 µm. Gel permeation chromatography in chloroform showed that the molecular weight of the PHA remained ca. 300 kDa, which is similar to the molecular weight before the thermal treatment. Importantly, thermal treatment of 2.5 min. or less was insufficient to melt the crystalline PHA particles under the above conditions, while treatment of 10 min. duration caused most of the PHA to congeal into a solid mass.

The thermal treatment was repeated using a suspension of crystalline PHA in water at 30% (wt/wt) solids, rather than 13% (wt/wt). The resulting product again was a suspension including amorphous PHA particles.

EXAMPLE 2

Preparation of Suspension of Amorphous Particles of PHBV Copolymer with a Monomer Ratio 75:25 HB/HV Cells of *Ralstonia eutrophus* NCIMB 40124 were fermented to high density on a mixture of glucose and valeric acid under conditions of phosphorus limitation. The cells contained 32% PHA (cell dry weight basis) which was a PHBV copolymer with a monomer ratio 75:25 HB/HV. The PHA was isolated as in Example 1, except that following peroxide treatment, the PHA was isolated by centrifugation and resuspension in water to give a polymer slurry of 6% solids (wt/wt). At this stage, the PHA had a crystallinity index of approximately 70%. The slurry was then processed four times at 20,000 psi through a Microfluidizer M110EH to reduce the particle size and then immersed for 5 min. in a sealed tube in a 200° C. oil bath. The resulting product was a suspension of amorphous PHA (0% crystallinity index by FTIR) with a median particle size of 0.73 µm.

EXAMPLE 3

Use of Continuous Flow Thermal Treatment Apparatus to Prepare Suspension of Amorphous Particles of PHBV Copolymer with a Monomer Ratio 92:8 HB/HV A continuous flow apparatus as illustrated in FIG. 1 was used to form a suspension of amorphous polymer particles. The apparatus included an electronic diaphragm metering pump (Pulsatron E series, 250 psi rated, maximum flow rate 0.79 L/hr), a heat exchanger (inlet ⅜" O.D.×12" stainless pipe; outlet ⅛" O.D. ×12" copper pipe), a heated zone (⅛ O.D.×1/16" I.D. copper pipe, four turns of ca. 4" diameter, immersed in a thermostatically controlled oil (Dow Corning 550 silicone) bath), and a pressure regulating valve (Swagelok, 50–350 psi adjustable). The apparatus also was equipped with a pressure gauge and two thermocouple-type electronic thermometers.

The oil bath was pre-heated to 175° C. and the apparatus was operated on a pure water feed stream for 15 min to purge air bubbles and approach thermal equilibrium. Fluid pressure was sufficient to prevent boiling of the water. After 15 min., the feed was changed to a PHA suspension (PHB-co-8%HV from Example 1 above, 13% wt/wt solids, ca. 0.5 µm median particle size, 100% crystallinity index, supplemented with 1% wt/vol potassium oleate). A flow rate of 16.5 mL/min was achieved at a pressure of 220–230 psi, which was sufficient to prevent boiling of the suspension. At this flow rate, the residence time of the suspension within the heated zone was approximately nine seconds. The temperature of the suspension leaving the heated zone was measured at 176° C., while the suspension leaving the outlet of the heat exchanger had a temperature of 66° C. The product suspension contained 13% (wt/wt) solids with 0% crystallinity index by FTIR. The optical microscope showed a submicron suspension of spherical particles.

EXAMPLE 4

Use of Continuous Flow Thermal Treatment Apparatus to Prepare Suspension of Amorphous PHB Particles The procedures described in Example 3 above were repeated using a suspension including crystalline PHB particles (7.5% wt./wt. solids, 0.61 µm median particle size, crystallinity index 50%), obtained from fermentation of *Ralstonia eutropha* on glucose. The heating bath of the continuous flow apparatus was maintained at 197° C. The suspension has a temperature of 180° C. leaving the heated zone, while the suspension leaving the outlet of the heat exchanger had a temperature of 61° C. The discharged product included amorphous PHB particles (0.83 µm median particle size, 0% crystallinity index).

Modifications and variations of the present invention will be obvious to those of skill in the art from the foregoing detailed description. Such modifications and variations are intended to come within the scope of the following claims.

We claim:

1. A composition comprising a stable suspension of amorphous polymer particles in a suspension medium, wherein the median size of the particles is less than about 20 µm.

2. The composition of claim 1 wherein the suspension is made using a process comprising
    (a) providing a suspension comprising crystalline or semi-crystalline polymer particles in a suspending medium;
    (b) heating the suspension to a temperature effective to cause the polymer to become amorphous; and
    (c) cooling the suspension below the melting point of the polymer at a rate effective to prevent substantial coalescence of the polymer particles.

3. The composition of claim 1 wherein the polymer particles have a median size less than about 5 µm.

4. The composition of claim 1 wherein the polymer is a polyhydroxyalkanoate.

5. The composition of claim 4 wherein the polymer particles have a median size less than about 1.5 µm.

6. The composition of claim 1 wherein the polymer particles are present in the suspension at a concentration of between about 5 and 40% wt/wt.

* * * * *